(12) United States Patent
Helou et al.

(10) Patent No.: US 8,415,448 B2
(45) Date of Patent: *Apr. 9, 2013

(54) CATALYTIC PROCESS FOR POLYMERISING CYCLIC CARBONATES ISSUED FROM RENEWABLE RESOURCES

(75) Inventors: Marion Helou, Ixelles (BE); Sophie Guillaume, Vitré (FR); Jean-François Carpentier, Acigne (FR); Olivier Miserque, Mont-Saint-Guibert (BE)

(73) Assignees: Total Petrochemicals Research Feluy, Seneffe (Feluy) (BE); Centre National de la Recherche Scientifique, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/056,015

(22) PCT Filed: Jul. 3, 2009

(86) PCT No.: PCT/EP2009/058398
§ 371 (c)(1),
(2), (4) Date: Apr. 5, 2011

(87) PCT Pub. No.: WO2010/012562
PCT Pub. Date: Feb. 4, 2010

(65) Prior Publication Data
US 2011/0184143 A1    Jul. 28, 2011

(30) Foreign Application Priority Data

Jul. 31, 2008  (EP) .................................... 08290749
Mar. 5, 2009   (EP) .................................... 09290159

(51) Int. Cl.
 *C08G 64/00*   (2006.01)
 *C08G 63/02*   (2006.01)
(52) U.S. Cl. .......................... 528/175; 528/128; 528/172
(58) Field of Classification Search .................. 528/128, 528/172, 175
See application file for complete search history.

(56) References Cited

U.S. PATENT DOCUMENTS

2011/0092664 A1*  4/2011  Carpentier et al. ........... 528/370
2011/0112273 A1*  5/2011  Carpentier et al. ........... 528/272

FOREIGN PATENT DOCUMENTS

EP    0600417 A   6/1994
WO    0164771 A   9/2001

OTHER PUBLICATIONS

Hans Kricheldorf et al, "Polymers of Carbonic Acid", Macromolecular Chemistry and Physics, Dec. 21, 2000, pp. 2557-2565, vol. 201, Wiley-VCH Verlag, Weinheim, DE.

* cited by examiner

*Primary Examiner* — Terressa Boykin

(57) ABSTRACT

This invention relates to the polymerisation of five-, six- or seven-membered cyclic carbonates by ring-opening polymerisation in the presence of a system comprising a metal salt such as triflate, triflimidate, acetylacetonate or carboxylate and an alcohol.

14 Claims, 1 Drawing Sheet

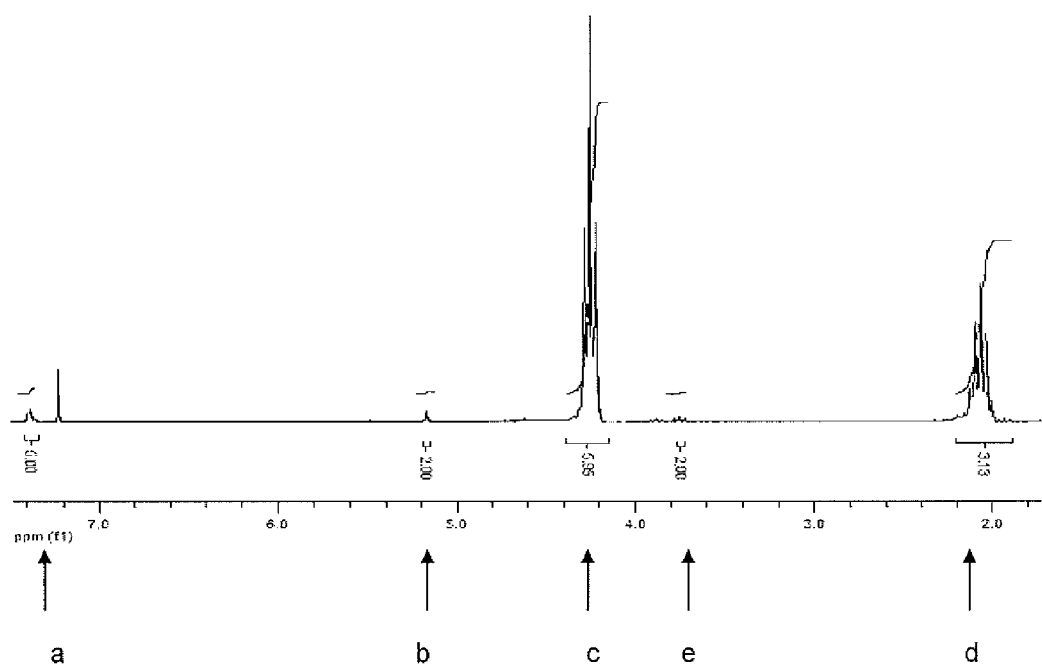

CATALYTIC PROCESS FOR POLYMERISING CYCLIC CARBONATES ISSUED FROM RENEWABLE RESOURCES

This invention relates to the synthesis of polycarbonates prepared from cyclic monomers derived from the biomass in the presence of a system comprising a metal catalyst and a transfer agent. It also relates to the resulting polymers derived from these cyclic monomers.

Several methods have been developed to prepare polycarbonates. The starting material is selected either from a five- or from a six-membered carbonate monomer. There is an abundant literature describing the synthesis of these compounds. The synthesis of six-membered carbonates is described for example in Bhanage et al. (Bhanage B. M., Fujita S., Ikushima Y., Arai M., in Green Chemistry, 5, 429, 2003), or in Wang et al. (Wang X. L., Zhuo, R. X., Liu L. J., He F., Liu G., in J. Polym. Sci. Part A, 40, 70, 2002), or in Wolinsky et al. (Wolinsky J. B., Ray III W C., Colson Y. L., Grinstaff M. W., in Macromolecules, 40, 7065, 2007, or in Gasset et al (EP-A-0,955,298).

The synthesis of five-membered carbonates is described for example in Aresta and Dibenedetto (Aresta M., Dibenedetto A., J. Mol. Catal. A: Chem., 257, 149, 2006) or in Robicki et al. (Robicki G., Rakoczy P., Parzuchowski P., in Green Chem., 7, 529, 2005) or in Ubaghs et al. (Ubaghs L., Fricke N., Keul H., Höcker H., in Macromol. Rapid Comm., 25, 517, 2004), or in Komura et al. (Komura H., Yoshino T., Ishido Y., in Bulletin of the chemical society of Japan, 46, 550, 1973) or in Matsumoto et al. (Matsumoto K., Fuwa S., Shimojo M., Kitajima H., in Bull. Chem. Soc. Jpn, 69, 2977, 1996).

Polymerisation of carbonates was typically carried out by ring-opening of the five- or six-membered carbonates either by organometallic catalysis or by organic catalysis. The advantage of organometallic catalysis was that it offers a controlled polymerisation. The most frequently used catalytic components were based on Sn(Oct)$_2$ as described for example in Kricheldorf and Stricker (Kricheldorf H. R., Stricker A., in Macromol. Chem. Phys. 201, 2557, 2000)

or biocompatible metals such as Mg, Ca, Fe or Zn as described for example in Darensbourg et al. (Darensbourg D., Wonsook C., Poulomi G., Casseday R., in Macromol. 37, 4374, 2006) or in Dobrzinsky et al. (Dobrzinsky P., Pastusiak M., Bero M., in J. Polym. Sci. Part A Polym. Chem., 43, 1913, 2004) or in Kuran et al. (Kuran W., Sobczak M., Listos T., Debek C., Florjanczyk Z., in Polymer. 41, 8531, 2000)

or group 3 metal (including the lanthanide series) complexes such as described for example in Palard et al. (Palard I., Schappacher M., Belloncle B., Soum A., Guillaume S., in Chem. Eur. J. 13, 1511, 2007) or in Zhao et al. (Zhao B., Lu C., Shen Q., in J. Appl. Polym. Sci., 25, 517, 2004) or in Sheng et al. (Sheng H., Zhou L., Zhang Y., Yao Y., Shen Q., in J. Polym. Sci. Part A Polym. Chem., 45, 1210, 2007).

The advantage of organic catalysis was that it offered polymerisation under mild conditions with non-metal catalyst components. They were based on enzymes such as described for example in Bisht et al. (Bisht S. K., Svirkin Y. Y., Henderson L. A., Gross R. A., in Macromolecules, 30, 7735, 1997) or in Gross et al. (Gross R. A., Kumar A., Kalra B., in Chem. Rev., 101, 2109, 2001) or in Koboyashi et al. (Koboyashi S., Uyama H., Kimura S., in Chem. Rev., 101, 3793, 2001).

organic compounds such as amines or guanidine as described for example in Nederberg et al. (Nederberg F., Lohmeijer G. B., Leibfarth F., Pratt R. C., Choi J., Dove A. P., Waymouth R. M., Heidrich J. L., in Biomacromolecules, 8, 153, 2007) or in Mindemark et al. (Mindemark J., Hilborn J., Bowden T., in Macromolecules, 40, 3515, 2007). They can also be based on strong Brönsted acids such as triflic acid as described for example in Kricheldorf, H. R. et al. (Kricheldorf, H. R. Weegen-Schulz, B. Jenssen, J. Macromolecular Symposia 1992, 60, 119-131) or in Endo T. et al (Endo T. Ariga, T. Takata, T. Macromolecules, 1997, 30, 737-744).

On the other hand, Lewis acids based on metal groups 2, 3, 4, 12, 13 such as magnesium, calcium, scandium, yttrium, cerium, samarium, ytterbium, zirconium, zinc, aluminum and tin triflates or triflimidates are known to be effective catalysts, in combination with a protic source such as an alcohol or a carboxylic acid, for the ring-opening polymerisation of cyclic esters such ϵ-caprolactone and lactide, as described for example in Moller et al. (Moller M., Kange R., Hedrick J. L., in J. Polym. Sci. A: Polym. Chem., Vol. 38, 2067-2074 (2000)), in Nomura et al. (Nomura N., Taira A., Nakase A., Tomioka T., Okada M., in Tetrahedron, Vol. 63, 8478-8484 (2007)), in Nomura et al. (Nomura N., Taira A., Tomioka T., Okada M., in Macromolecules, Vol. 33, 1497-1499 (2000)), in Wang et al. (Wang Y., Kunioka M., in Macromol. Symp. Vol. 224, 193-205 (2005)), in Kunioka et al. (Kunioka M., Wang Y., Onozawa S. Y., in Macromol. Symp. Vol. 224, 167-179 (2005)), in Gorczynski et al. (Gorczynski J. L., Chen J., Fraser C. L., in JACS, Vol. 127, 14 956-14 957 (2005)), in Dobrzynski et al. (Dobrzynski P., Pastusiak M., Bero M., in J. Polym. Sci. A: Polym. Chem., Vol. 43, 1913-1922 (2005)), in Funasabi et al. (Funasabi M., Kunioka M; in Macromol. Symp. 2005, 224, 309.32.

It is an aim of the present invention to provide a method for polymerising cyclic carbonate compounds using small amounts of a metal catalyst.

It is another aim of the present invention to use, in combination with the small amounts of the metal catalyst, large amounts of a transfer agent to achieve so-called "immortal" polymerisation of cyclic carbonate compounds.

It is a further aim of the present invention to control and tune the characteristics and properties of the resulting polycarbonates.

In particular, it is another aim to prepare functionalised polycarbonates selectively end-capped by a group originating from the transfer agent.

It is yet another aim of the present invention to apply the method of the immortal ring-opening polymerisation to new cyclic carbonates derived from glycerol.

It is yet a further aim of the present invention to develop a catalyst system operative on technical grade carbonate monomers, without specific preliminary purification.

Any one of those aims is, at least partially, fulfilled by the present invention.

LIST OF FIGURES

FIG. 1 represents the $^1$H NMR spectrum of the precipitated polymer prepared in example 1.

Accordingly, the present invention discloses a process for polymerising five- or six- or seven-membered cyclic carbonates by ring-opening polymerisation in the presence of a system comprising a metal salt such as triflate, triflimidate, acetylacetonate or carboxylate and an alcohol, characterised in that the number average molecular weight Mn of the final polymer is controlled by the monomer/alcohol ratio.

The alcohol is acting as co-activator and as transfer agent.

The metallic salt can be selected from metallic complexes of formula $M(OSO_2CF_3)_n$, hereafter referred to as triflates or OTf or $M(N(OSO_2CF_3)_2)_n$, hereafter referred to as triflimidates or $NTf_2$ or $M(RC(O)CR_2C(O)R)_n$, hereafter referred to as acetylacetonates or acac or $(R''CO_2)_nM$, hereafter referred to as carboxylates, wherein M is a metal Group 2, 3, including the lanthanide series, hereafter referred as Ln, 4, 12, 13, 14 or 15 of the periodic Table, wherein each R is selected independently from a linear or branched hydrocarbyl radical having from 1 to 12 carbon atoms, substituted or not by for instance an halogen or heteroatom, wherein each R" is selected independently from a perfluorinated alkyl or aryl residue having from 1 to 12 carbon atoms, and wherein n is the valence of M.

Preferably, M is Mg(II), Ca(II), Sc(III), Y(III), Sm(III), Yb(III), Zr(IV), Fe(II), Fe(III), Zn(II), Al(III) Sn(IV) or Bi(III). More preferably, it is Al, Zn or Sc, Al being the most efficient metal.

Preferably each R is selected independently from a alkyl group such as $CH_3$ or a substituted alkyl group such as $CF_3$, More preferably, they are all the same and they are $CF_3$.

Preferably, R" is $(C_6F_5)$ or $(CF_3)$, or $CF_3(CF_2)_m$ wherein m is an integer from 1 to 6.

The alcohol can be represented by formula R'OH wherein R' is an hydrocarbyl, linear or branched, having from 1 to 20 carbon atoms. Preferably R' is a secondary alkyl residue or benzylic group, more preferably it is isopropyl ($^iPr$) or benzyl (Bn). It can also be a poly-ol such as diol, triol or higher functionality polyhydridic alcohol. Typically it can be selected from propanediol or trimethylolpropane, possibly derived from biomass such as glycerol or any other sugar-based alcohol such as for example erythritol or cyclodextrine. All alcohols can be used individually or in combination.

Among the preferred catalytic compounds according to the present invention, one can cite $Al(OTf)_3$, $Al(NTf_2)_3$, $Mg(OTf)_2$, $Ca(OTf)_2$, $Zn(OTf)_2$, $Sc(OTf)_3$, $Bi(OTf)_3$, $Fe(acac)_3$, $Al(OCOCF_3)_3$, $ZN(OCOCF_3)_2$, $Zn(acac)_2$, In these embodiments, the catalyst system also comprises an alcohol. In the present invention, the catalyst system operates via a so-called "activated monomer pathway". That means that the metal centre of the metal salt behaves as a Lewis acid onto which the carbonyl function of the monomer coordinates in the course of catalysis. This results eventually in an increase of the electrophilicity at the carbon atom of the monomer carbonyl group, which is therefore prone to being attacked by an external nucleophile such as the alcohol co-catalyst, or any other protic source such as for example water or carboxylic acid.

The present mechanism differs from the so-called "coordination-insertion" mechanism. In the present mechanism, the nucleophile is external in that it is not sigma-bonded to the metal center in the pre-catalyst, while in the coordination-insertion mechanism, the nucleophile is included in the pre-catalyst and active catalyst as a sigma-bonded ligand of the metal complex, under the form of an alkoxide, amide or borohydride group.

In the current "activated monomer pathway", the alcohol plays two roles:
- as an external nucleophile for initiating the polymerisation via the ring-opening of the activated monomer; 1 equivalent of alcohol per metal centre is used in the process;
- as a transfer agent, by generating multiple polymer chains; all excess alcohol molecules are used in this second process, and the final molecular weight of the polymer is a function of the alcohol-to-monomer ratio.

It can be represented schematically as follows:
1. Initiation mechanism by ring opening (ROP) of the activated monomer

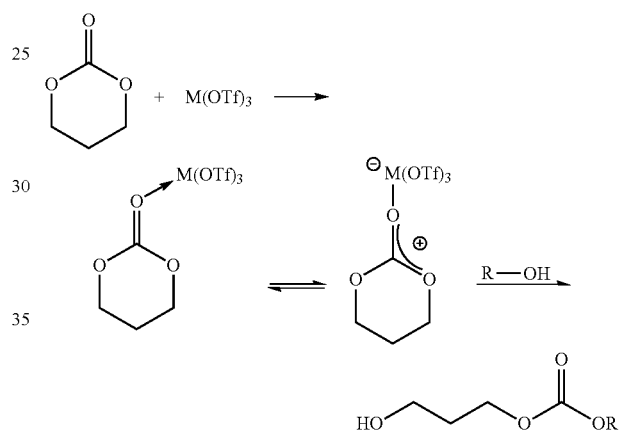

2. Propagation and Transfer mechanism

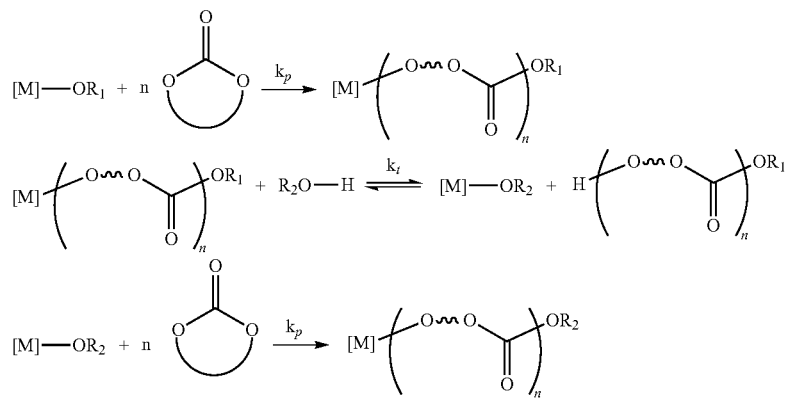

In the "coordination-insertion" mechanism, the alcohol also plays two roles but in a different manner:
- the alcohol transforms the pre-catalyst, that has little or no activity, into an active alkoxide-metal species, via an alcoholysis process;
- as a transfer agent like in the other mechanism.

Excess alcohol acts as transfer agent, transferring propagating polycarbonate chains from the active metal center to dormant hydroxy-end capped polycarbonate chains. Accordingly, it is observed that the number average molecular weight increases when the monomer/alcohol ratio increases. The ratio monomer/alcohol is of from 5 to 1000, preferably it is of from 10 to 500.

Optionally, the alcohol can contain a functional group which will be selectively capping the terminus of each polycarbonate chain. This functional group can be used for various purposes. As non-limiting examples, one can cite:
a) vinyl end-groups which can (i) promote further copolymerisation with other olefin-type monomers; or (ii) be transformed into other functional groups such as for instance epoxide, alcohol, or 1,2-diol.
b) nitroxide or alkoxyamine end-groups which can promote controlled radical polymerisation and/or ring-opening polymerisations,
c) fluorinated pony-tails.

The system described in the present invention allows transforming very large amounts of monomer with minute amounts of metal catalyst. The ratio monomer to metal is of from 100 to 1,000,000, preferably it is of from 10,000 to 500,000.

Polymerisation can be carried out in bulk or in solution. Usual aromatic and aliphatic hydrocarbons can be used for that purpose.

Polymerisation can be carried out on technical, unpurified monomer since the Lewis acids based metal catalysts are rather prone to withstand umpurity traces.

Polymerisation is conducted at a temperature ranging from 20° C. to 180° C., preferably between 100 and 150° C. The pressure ranges from 0.5 to 20 atm, preferably it is 1 atm.

The polycarbonates thus prepared show typically a unimodal molecular weight distribution that ranges from 1.1 to 5.0, more typically from 1.5 to 1.8.

The number average molecular weight Mn can be tuned by the monomer-to-alcohol ratio and ranges from 1 000 to 1 000 000 g/mol, more typically from 10 000 to 250 000 g/mol.

This polymerisation process is operative for 5- to 7-membered cyclic carbonates. Preferably, this polymerisation process is operative for 6-membered cyclic carbonates.

The polycarbonates that can be used in the present invention are selected for example from trimethylenecarbonate (TMC), 2-benzyloxy-trimethylenecarbonate (BTMC), 2-hydroxy-trimethylenecarbonate (TMCOH), 4-(benzyloxymethyl)-1,3-dioxolan-2-one (BDMC), 4-(hydroxymethyl)-1,3-dioxolan-2-one (DMCOH), In particular, one can cite new cyclic carbonates such as 2-oxy-trimethylenecarbonate (OTMC), and dehydrotrimethylenecarbonate (DHTMC).

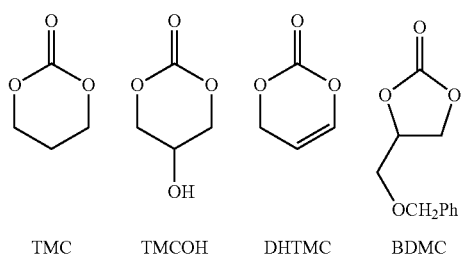

TMC   TMCOH   DHTMC   BDMC

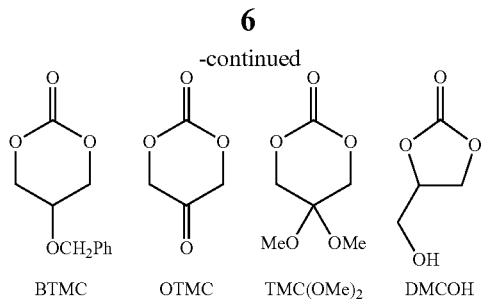

BTMC   OTMC   TMC(OMe)$_2$   DMCOH

Copolymers resulting from any combinations of these monomers are also included in the present invention.

One of the main advantages of the present invention is that the cyclic carbonate monomer does not need to be purified. By unpurified is meant the technical grade taken off the shelf without any further treatment and thus containing water and free acid. The catalyst system of the present invention is very robust and does not have fragile covalent bonds as disclosed in the prior art Zn-based catalyst systems.

EXAMPLES

The polymerisation of trimethylenecarbonate (TMC) has been carried out with various catalyst components, alcohol initiators and polymerisation conditions.

Example 1

TMC, purified by drying over calcium hydride and finally recrystallised, was polymerised in the presence of a metal catalyst and an alcohol initiator R'OH.

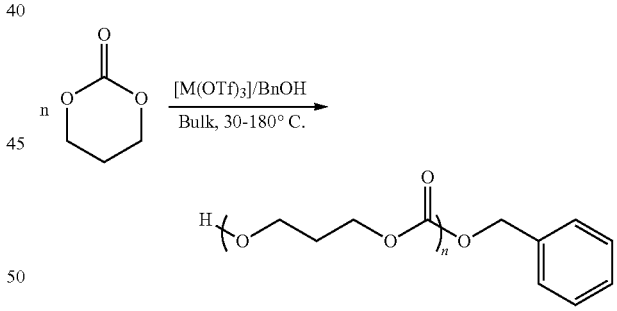

BnOH was selected as the alcohol and the ratio TMC/Metal salt/ROH was set at 500:1:5. The polymerisation temperature and the polymerisation time were varied as indicated in Table I.

The conversion rate expressed in %, the theoretical and experimental number average molecular weight and the polydispersity index Pl, represented by Mw/Mn, are disclosed in Table 1.

The theoretical number average molecular weight was calculated as $$Mn_{theo}=[TMC]/[BnOH] \times M_{TMC} \times \text{conversion} + M_{BnOH}$$

with $M_{TMC}$=102.09 g/mol, $M_{BnOH}$=108.14 g/mol

TABLE I

| Entry | cat. | Time (min) | T °C. | Conv (%) | $M_{ntheo}$ (g·mol$^{-1}$) | $Mn_{NMR}$ (g·mol$^{-1}$) | $M_{nSEC}$ (g·mol$^{-1}$) | $M_w/M_n$ | TON (mol/mol/h) |
|---|---|---|---|---|---|---|---|---|---|
| 1 | Fe(acac)$_3$ | 160 | 110 | 90 | 9300 | 10500 | 12050 | 1.56 | 169 |
| 2 | Sc(OTf)$_3$ | 150 | 60 | 19 | nd | nd | nd | nd | 38 |
| 3 | Sc(OTf)$_3$ | 120 | 110 | 78 | 8070 | 9380 | 10100 | 1.47 | 195 |
| 4 | Al(OTf)$_3$ | 30 | 110 | 88 | 9090 | Nd | 13500 | 1.57 | 880 |
| 5 | Al(OTf)$_3$ | 60 | 110 | 96 | 9900 | nd | 13800 | 1.62 | 480 |
| 6 | Zn(OTf)$_2$ | 180 | 110 | 30 | 3170 | 2920 | nd | nd | 50 |
| 7 | Zn(OTf)$_2$ | 30 | 150 | 97 | 10010 | 9790 | 11340 | 1.62 | 970 |
| 8 | Ca(OTf)$_2$ | 120 | 110 | <10 | nd | nd | nd | nd | <25 |
| 9 | Ca(OTf)$_2$ | 30 | 150 | 95 | 9806 | 11330 | 11680 | 1.64 | 950 |
| 10 | Bi(OTf)$_3$ | 60 | 110 | 99 | 10200 | 11500 | 11900 | 1.45 | 495 |
| 11 | Bi(OTf)$_3$ | 30 | 150 | 99 | 10200 | 10950 | 11400 | 1.51 | 990 |

The number and weight average molecular weights Mn and Mw, and polydispersity (Mw/Mn)index were determined by Size Exclusion Chromatography (SEC) in THF versus PS standards and corrected with a Mark-Houwink factor of 0.73.

The $^1$H NMR spectrum of a typical precipitated polymer prepared according to the above procedure can be seen in FIG. 1

It can be seen that Al is one of the most efficient metal at 110° C. It is speculated that the Lewis acidity of the metal plays an important role, the efficiency of the metal increasing with increasing acidity. Aluminum(III) trifalte is very active. High activities are also obtained with bismuth (III), calcium (II) and zinc(II) triflates.

Example 2

The polymerisation of unpurified trimethylene carbonate was carried out with Al(OTf)$_3$ or Sc(OTf)$_3$ and BnOH. By unpurified is meant the technical grade taken off the shelf without any further treatment and thus containing water and free acid. The ratio TMC/Metal triflate/BnOH was set at 10 000:1:10

Temp modifiee 110-150

The experimental conditions and results are displayed in Table II.

TABLE II

| entry | cat. | T (°C.) | Time (min) | Conv (%) | $M_{ntheo}$ (g·mol$^{-1}$) | $M_{nSEC}$ (g·mol-1) | Mw/Mn | TON (mol/mol/h) |
|---|---|---|---|---|---|---|---|---|
| 1 | Sc(OTf)$_3$ | 110 | 900 | 76 | 77580 | 58900 | 1.76 | 507 |
| 2 | Sc(OTf)$_3$ | 150 | 150 | 85 | 86880 | 20200 | 1.30 | 3400 |
| 3 | Al(OTf)$_3$ | 110 | 120 | 75 | 76680 | 54200 | 1.53 | 3750 |
| 4 | Al(OTf)$_3$ | 150 | 20 | 92 | 104960 | 61200 | 1.42 | 27600 |

It can be seen that very high conversions can be reached with small amounts of metal catalysts, as low as 100 ppm, leading to polycarbonates with high molecular weights and narrow polydispersities.

Example 3

The polymerisation of technical-grade unpurified trimethylene carbonate was carried out with Al(OTf)$_3$ and the nature of the alcohol was varied. The ratio [TMC]/[Metal trifiate]/[R'OH] was set at 10 000:1:10 and the ratio [TMC]/[Metal triflate]/[n-OH] was set at 500:1:5.

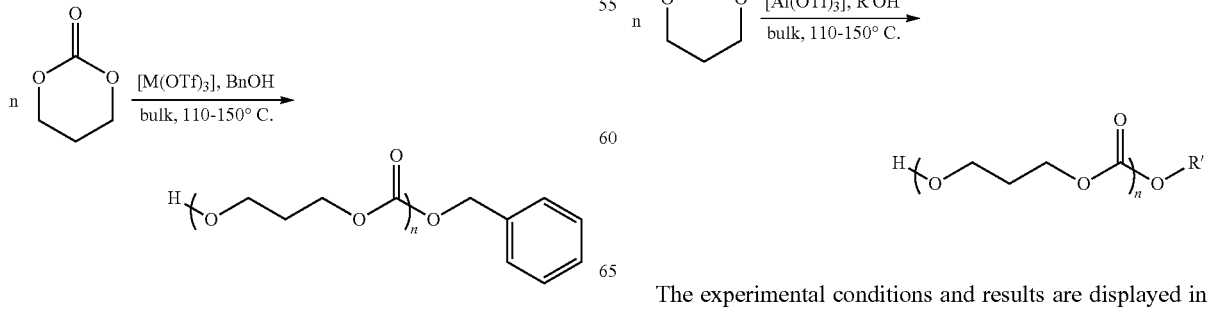

The experimental conditions and results are displayed in Table III.

TABLE III

| entry | [R'OH] | T (°C.) | Time (min) | Conv (%) | $M_{ntheo}$ (g·mol$^{-1}$) | $M_{nSEC}$ (g·mol$^{-1}$) | Mw/Mn | TON (mol/mol/h) |
|---|---|---|---|---|---|---|---|---|
| 1 | PhCH$_2$OH | 110 | 120 | 75 | 76680 | 54200 | 1.53 | 3750 |
| 2 | PhCH$_2$OH | 150 | 20 | 92 | 104970 | 61200 | 1.42 | 27600 |
| 3 | iPrOH | 110 | 150 | 68 | 69480 | 44600 | 1.48 | 2720 |
| 4 | iPrOH | 150 | 40 | 77 | 78650 | 26100 | 1.42 | 11550 |
| 5 | 2-butanol | 110 | 120 | 64 | 65410 | 43200 | 1.52 | 3200 |
| 6 | 2-butanol | 150 | 20 | 84 | 85830 | 50200 | 1.44 | 25200 |
| 7 | 3buten-2-ol | 110 | 150 | 59 | 60850 | 51560 | 1.59 | 2360 |
| 8 | 3-buten-2-ol | 150 | 30 | 91 | 93800 | 64900 | 1.58 | 18200 |
| 9 | 4-bromophenol | 110 | 150 | 80 | 81844 | 61280 | 1.46 | 3200 |
| 10 | 4-bromophenol | 150 | 30 | 90 | 91970 | 59320 | 1.52 | 18000 |
| 11 | propanediol | 110 | 60 | 98 | 10100 | 17300 | 1.50 | 490 |
| 12 | 1,4-benzenedimethanol | 110 | 60 | 94 | 9730 | 12190 | 1.49 | 470 |
| 13 | glycerol | 110 | 20 | 98 | 10100 | 8490 | 1.71 | 1470 |

It can be seen that the nature of the alcohol can be varied while maintaining the catalyst performance. The alcohol, however, does affect the catalyst activity, and the best activities are observed with benzyl alcohol (BnOH).

Example 4

The polymerisation of technical-grade unpurified trimethylene carbonate was carried out with Al(OTf)$_3$ and iPrOH or BnOH as the alcohol. The ratio TMC/Metal triflate/R'OH was largely increased and varied as shown in Table IV.

$Mn_{theo} = [TMC]/[R'OH] \times M_{TMC} \times \text{conversion} + M_{R'OH}$ with $M_{TMC}$=102.09 g/mol, $M_{BnOH}$=108.14 and $M_{iPrOH}$=60.10 g/mol X=amount of chain transfer agent arising from the monomer and calculated from $Mn_{SEC} = [TMC]/\{X \times ([TMC]/[Al]) + ([R'nOH]/[Al])\} \times M_{TMC} \times \text{conversion}$ Mn'theo=[TMC]/{Xav+[BnOH]}×$M_{TMC}$×conversion, with Xav=average of all 7 X values=0.0056

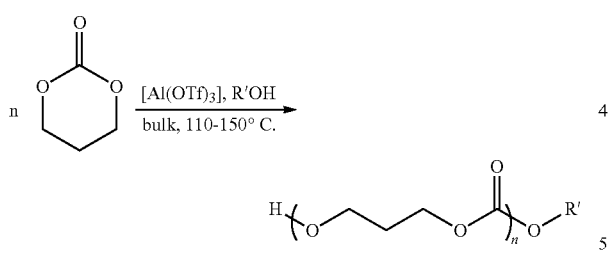

The experimental conditions and results are displayed in Table IV.

It can be seen that, for a given [BnOH]/[Al] ratio (e.g. 10, 20 or 50), increasing the monomer loading from 10 000 up to 50 000, results in an increase of the molecular weight of the final polymer recovered. Also, for a given monomer loading (e.g. [TMC]/[Al]=10 000, 25 000 or 50 000), increasing the [BnOH]/[Al] ratio from 10 to 50, results in a decrease of the molecular weight of the final polymer recovered. This indicates that the molecular weight of the polycarbonate can be controlled by tuning the [TMC]/[Al]/[BnOH] ratio. One can note that the experimental molecular weights are always lower than the values ($M_{ntheo}$) calculated from the [TMC]/[Al]/[BnOH] ratio. This indicates that some impurities contained in the technical-grade monomer also act as transfer agents. The amount of impurities (X) can be evaluated, and is found to be constant for a given batch of monomer. As expected, the Mn'$_{theo}$ values calculated by taking into account X content of impurities fit very well with the Mn$_{SEC}$ values determined experimentally by SEC. This approach allows thus the <<at will>> preparation of polymers with predetermined molecular weights, based on the [TMC]/[Al]/[BnOH] ratio and the X content of <<transfer active>> impurities contained in the technical grade monomer.

The invention claimed is:

1. A process for polymerizing five-, six- or seven-membered cyclic carbonates by ring-opening polymerization in the presence of a system comprising:
    a metal salt selected from the group consisting of triflate, triflimidate, acetylacetonate and carboxylate; and
    an alcohol, wherein the alcohol is represented by the formula R'OH, a poly-ol selected from the group consisting of diol, triol and a polyhydridic alcohol represented by the form R'(OH)$_n$, or a combination thereof, wherein R' is an hydrocarbyl, linear or branched having from 1 to 20 carbon atoms, wherein the number average molecular weight Mn of the final polymer is controlled by the ratio monomer/alcohol, and wherein the ratio monomer/alco-

TABLE IV

| entry | ROH | [TMC]/[Al]/[BnOH] | Time (min) | Conv (%) | $M_{ntheo}$ (g·mol$^{-1}$) | $M_{nSEC}$ (g·mol$^{-1}$) | Mw/Mn | TON (mol/mol/h) | X (%) | Mn'$_{theo}$ (g·mol$^{-1}$) |
|---|---|---|---|---|---|---|---|---|---|---|
| 1 | BnOH | 10000/1/10 | 90 | 92 | 94030 | 53200 | 1.56 | 6130 | 0.076 | 60262 |
| 2 | iPrOH | 10000/1/10 | 90 | 94 | 96025 | 61230 | 1.55 | 6270 | 0.057 | 61522 |
| 3 | BnOH | 25000/1/10 | 240 | 88 | 224700 | 83860 | 1.56 | 5500 | 0.067 | 93608 |
| 4 | BnOH | 25000/1/20 | 240 | 96 | 122616 | 70120 | 1.54 | 6000 | 0.060 | 72108 |
| 5 | BnOH | 25000/1/50 | 240 | 84 | 42990 | 35770 | 1.56 | 5250 | 0.040 | 33580 |
| 6 | BnOH | 50000/1/20 | 480 | 90 | 229810 | 102270 | 1.53 | 5625 | 0.050 | 95730 |
| 7 | BnOH | 50000/1/50 | 480 | 75 | 76610 | 53730 | 1.59 | 4690 | 0.043 | 49150 | hol is of from 5 to 1000 and the ratio monomer to metal is of from 100 to 1,000,000, and wherein the metal salt is a metallic complex of formula $M(OSO_2CF_3)_n$ (OTf) or $M(N(OSO_2CF_3)_2)_n$ (NTf$_2$) or $M(RC(O)CR_2C(O)R)_n$ (acac) or $(R''CO_2)_nM$ (carboxylates), wherein M is a metal Group 2, 3, including the lanthanide series Ln, 4, 12, 13, 14 or 15 of the periodic Table, wherein each R is selected independently from a linear or branched hydrocarbyl radical having from 1 to 12 carbon atoms, wherein each R" is selected independently from a perfluorinated alkyl or aryl residue having from 1 to 12 carbon atoms, and wherein n is the valence of M.

2. The process of claim 1 wherein the metal is Mg(II), Ca(II), Sc(III), Y(III), Sm(III), Yb(III), Zr(IV), Fe(II), Fe(III), Zn(II), Al(III), Sn(IV) or Bi(III).

3. The process of claim 1 wherein the metal salt is Al(OTf)$_3$, Al(NTf$_2$)$_3$, Mg(OTf)$_2$, Ca(OTf)$_2$, Zn(OTf)$_2$, Sc(OTf)$_3$, Fe(acac)$_3$, Al(OCOCF$_3$)$_3$, ZN(OCOCF$_3$)$_2$, or Zn(acac)$_2$.

4. The process of claim 1 wherein in alcohol R'OH or poly-ol R'(OH)$_n$, R' is a primary or secondary alkyl residue or a benzylic group_or combinations thereof.

5. The process of claim 4 wherein the alcohol is isopropyl ($^i$Pr) or benzyl (Bn) alcohol.

6. The process of claim 1 wherein the ratio monomer/alcohol is of from 10 to 500.

7. The process of claim 4 wherein the polyol is propanediol, 1,4-benzenedimethanol or glycerol.

8. The process of claim 1 wherein the alcohol additionally contains a functional group that is capping the end of each polycarbonate chain.

9. The process of claim 1 wherein the ratio monomer/metal is of from 10,000 to 500,000.

10. The process of claim 1 wherein the carbonate is a 5-, 6- or 7-membered cyclic carbonate selected from the group consisting of trimethylenecarbonate (TMC), 2-benzyloxy-trimethylenecarbonate (BTMC), 2-hydroxy-trimethylenecarbonate (TMCOH), 4-(benzyloxymethyl)-1,3-dioxolan-2-one (BDMC), 4-(hydroxymethyl)-1,3-dioxolan-2-one (DMCOH), 2-oxy-trimethylenecarbonate (OTMC), dehydrotrimethylenecarbonate (DHTMC), or a combination thereof.

11. The process of claim 10 wherein the five-, six- or seven-membered carbonates are OTMC or DHTMC.

12. The process of claim 10 wherein the five-, six- or seven-membered carbonate is an unpurified technical-grade product.

13. Homo- or co-polymers of carbonates obtained by the process of claim 1.

14. Homo- or co-polymers of carbonates obtained by the process of claim 10.

* * * * *